(12) United States Patent
Zheng

(10) Patent No.: US 7,293,273 B2
(45) Date of Patent: Nov. 6, 2007

(54) SLIM-TYPE DISC DRIVE

(75) Inventor: Tian-You Zheng, Taipei (TW)

(73) Assignee: ASUSTek, Taipei (TW)

( * ) Notice: Subject to any disclaimer, the term of this patent is extended or adjusted under 35 U.S.C. 154(b) by 425 days.

(21) Appl. No.: 10/890,268

(22) Filed: Jul. 14, 2004

(65) Prior Publication Data

US 2005/0050566 A1    Mar. 3, 2005

(30) Foreign Application Priority Data

Aug. 26, 2003  (TW) .............................. 92123502 A

(51) Int. Cl.
*G11B 17/03* (2006.01)
(52) U.S. Cl. .................................................. 720/655
(58) Field of Classification Search .................. 720/655
See application file for complete search history.

(56) References Cited

U.S. PATENT DOCUMENTS

| 6,731,580 | B1 * | 5/2004 | Sato et al. .................. 720/655 |
| 6,731,581 | B2 * | 5/2004 | Huang ........................ 720/655 |
| 6,868,547 | B1 * | 3/2005 | Srikumar .................... 720/655 |
| 2002/0136139 | A1 * | 9/2002 | Yano et al. ................. 369/75.1 |
| 2003/0063548 | A1 * | 4/2003 | Huang ....................... 369/75.1 |
| 2003/0152010 | A1 * | 8/2003 | Liao et al. ................. 369/75.1 |
| 2004/0062172 | A1 * | 4/2004 | Huang ....................... 369/75.1 |
| 2004/0187143 | A1 * | 9/2004 | Tolkachev et al. .......... 720/655 |
| 2005/0034140 | A1 * | 2/2005 | Chang ........................ 720/655 |

FOREIGN PATENT DOCUMENTS

| CN | 2519378 Y | 10/2002 |
| JP | 2001-126356 | 5/2001 |

* cited by examiner

*Primary Examiner*—David Davis
(74) *Attorney, Agent, or Firm*—Rabin & Berdo, PC

(57) ABSTRACT

A slim-type disc drive comprising a casing, a hinge cover and an elasticity element is provided. The casing has an indentation section and a hole, wherein the indentation section is for accommodating a CD. The hinge cover is pivotally connected to the casing and is able to cover up the indentation section, wherein the hinge cover has a projection section passing through the hole. The elasticity element is disposed inside the casing and contacts the projection section which receives an elasticity force from the elasticity element when the hinge cover covers up the indentation section.

7 Claims, 8 Drawing Sheets

SLIM-TYPE DISC DRIVE

This application claims the benefit of Taiwan application Serial No. 092123502, filed Aug. 26, 2003, the subject matter of which is incorporated herein by reference.

BACKGROUND OF THE INVENTION

1. Field of the Invention

The invention relates in general to an external disc drive, and more particularly to a slim-type external disc drive.

2. Description of the Related Art

Facing the rapid and fast accumulation of knowledge, most multi-media products are issued in the form of CD. Furthermore, due to the wide popularity of CD, every PC is equipped with a disc drive. Disc drives really play an important role in the application of multi-media.

External and portable slim-type disc drives have a smart appearance and are easy and simple to be connected to. For example, it can be handily connected to a computer or a notebook at the office, the house or the factory.

Referring to FIG. 1, a block diagram of a conventional slim-type disc drive is shown. The conventional slim-type disc drive 10 mainly includes a casing 101, a hinge cover 103, and a torsion spring 105. Casing 101 has an indentation section 1010 for accommodating a CD and an interior for accommodating electronic elements, such as a circuit board, for instance.

Hinge cover 103 is pivotally connected to casing 101, while torsion spring 105 is disposed on the surface of casing 101. Tail end 1050 of torsion spring 105 contacts hinge cover 103. Hinge cover 103 has a close status and an open status in relation to casing 101. When hinge cover 103 is closed, hinge cover 103 makes torsion spring 105 elastically distorted, while the elasticity of the distorted torsion spring 105 is applied onto hinge cover 103.

In order to uplift hinge cover 103 and have it opened, torsion spring 105 of the conventional slim-type disc drive 10 is disposed on the surface of casing 101. Furthermore, the tail end 1050 of torsion spring 105 is exposed between hinge cover 103 and casing 101.

However, the above design really affects the smartness and simplicity of the integral design; moreover, objects can easily get hooked on tail end 1050 of torsion spring 105.

SUMMARY OF THE INVENTION

It is therefore an object of the invention to provide a slim-type disc drive whose appearance is further prettified and whose torsion spring which uplifts the hinge cover is concealed inside the casing.

It is therefore an object of the invention to provide a slim-type disc drive to be incorporated with CD. The slim-type disc drive includes at least an upper casing, a hinge cover, and an elasticity element. The upper casing has a hole, a first side, and a second face, wherein the first side has an indentation section for accommodating CD. The hinge cover is pivotally connected to the upper casing and is able to cover up the indentation section. Moreover, the hinge cover has a projection section which passes through the hole. Elasticity element is disposed on the second side and contacts the projection section. When the hinge cover covers up the indentation section, the elasticity force of the elasticity element is applied onto the projection section. Of which, the elasticity element can be a torsion spring with a tail end through which the elasticity force of the torsion spring is applied onto the projection section. The torsion spring can further have a wraparound section through which the torsion spring is wrapped around a bump formed on the second face. The above slim-type disc drive can further include a lower casing which is coupled to the upper casing and is able to cover up the second face.

Other objects, features, and advantages of the invention will become apparent from the following detailed description of the preferred but non-limiting embodiments. The following description is made with reference to the accompanying drawings.

DETAILED DESCRIPTION OF THE INVENTION

While the invention is described by way of example and in terms of a preferred embodiment, it is to be understood that the invention is not limited thereto. However, the slim-type disc drive disclosed in the preferred embodiment is only an example of the spirit of the invention. Nevertheless, the features of the technology according to the invention are elaborated below.

Figure 1:
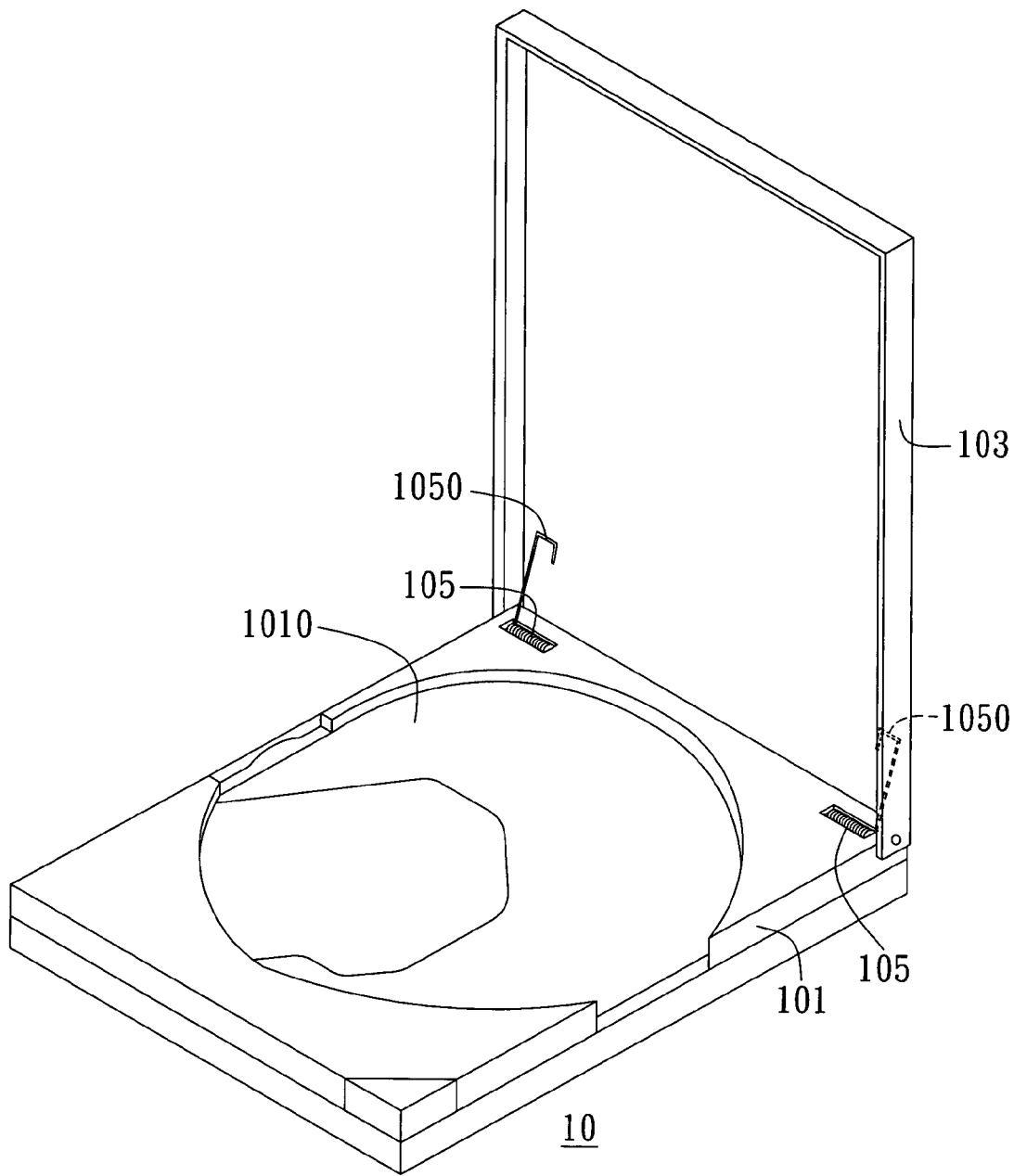
FIG. 1 shows a block diagram of a conventional slim-type disc drive.
Figure 2A:
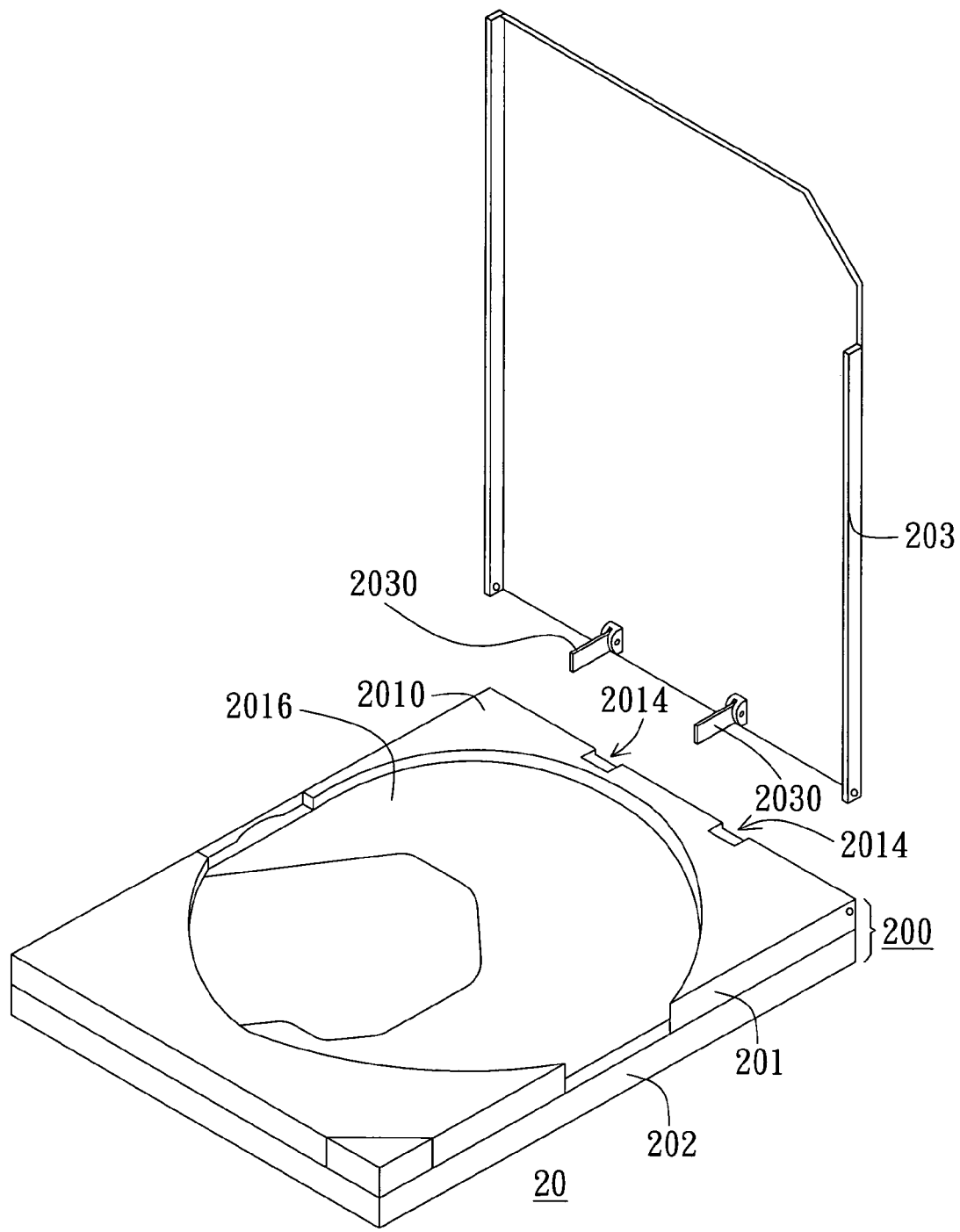
FIG. 2A shows a decomposition diagram of a slim-type disc drive according to the preferred embodiment of the invention.

Referring to FIG. 2A, a decomposition diagram of a slim-type disc drive according to the preferred embodiment of the invention is shown. The slim-type disc drive 20, which is to be used with a CD, mainly includes a casing 200 assembled by an upper casing portion 201 and a lower casing portion 202, hinge cover 203, and an elasticity element, such as a torsion spring, for instance (not shown here).

Figure 2B:
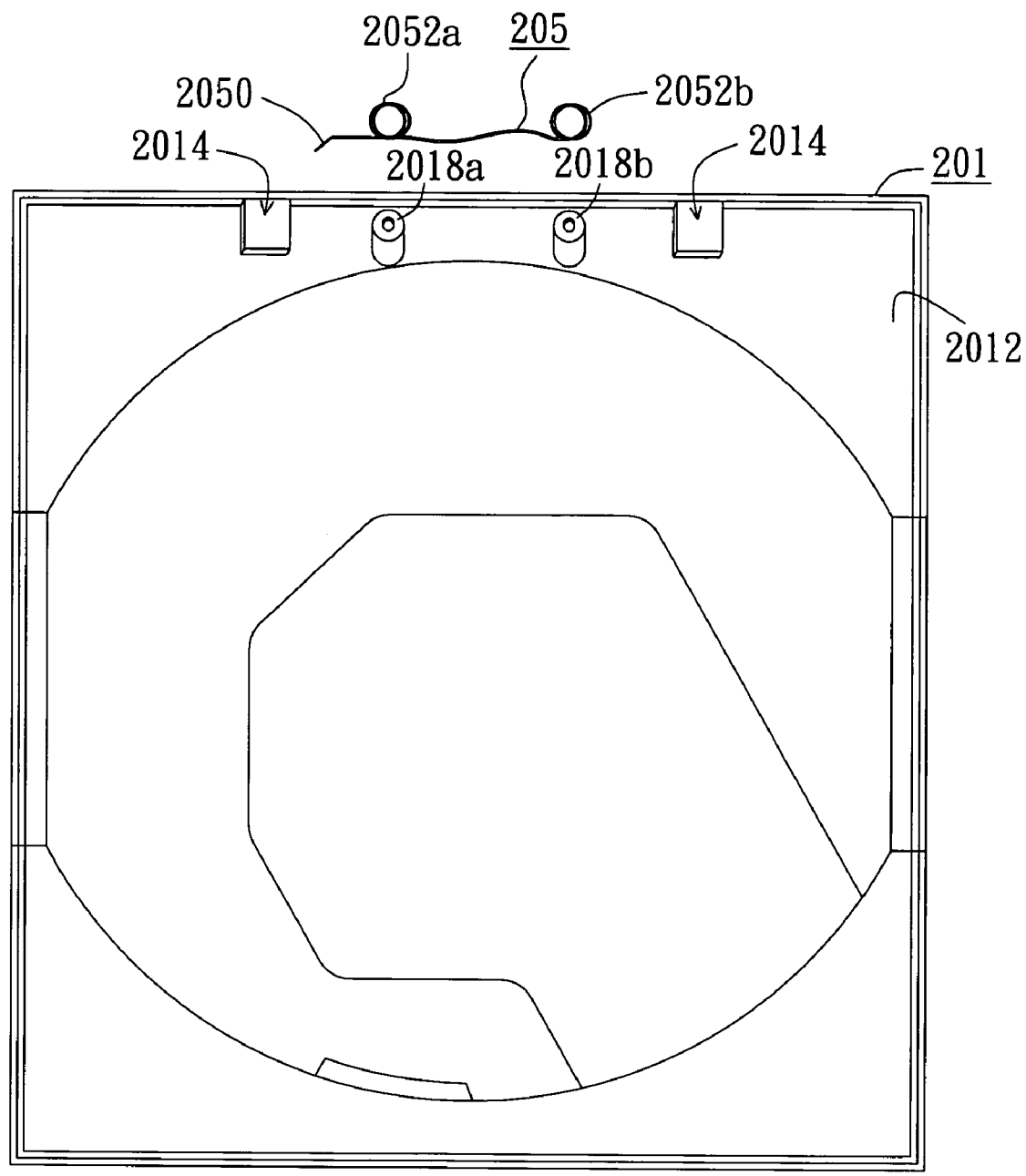
FIG. 2B shows a structure diagram of the torsion spring and second side of the upper casing.

Refer to FIG. 2A and FIG. 2B at the same time. FIG. 2B is a structure diagram of the torsion spring and second (inner) side of the upper casing. Upper casing 201 has a first side 2010 as shown in FIG. 2A and a second side 2012, the rear side of first side 2010, as shown in FIG. 2B. The second side 2012 of upper casing 201 as shown in FIG. 2B can be viewed by removing lower casing 202 from FIG. 2A. The lower casing 202 in FIG. 2A is coupled to upper casing 201 to form casing 200, wherein lower casing 202 is able to cover up the second side 2012 in FIG. 2B.

Referring to FIG. 2A, upper casing 201 has plural holes 2014 thereon. Moreover, first side 2010 of upper casing 201 is formed with an indentation section 2016 thereon for the accommodation of a CD. Hinge cover 203, which is pivotally connected to upper casing 201, is able to cover up first side 2010 which has an indentation section 2016 thereon. Hinge cover 203 has a projection section 2030 for passing through hole 2014.

As shown in FIG. 2B, bumps 2018a and 2018b are formed on the second side 2012 of upper casing 201. Torsion spring 205, an example of elasticity element, has a tail end 2050 and wraparound sections 2052a and 2052b through which torsion spring is wrapped around bumps 2018a and 2018b so that torsion spring 205 can be disposed on second side 2012. In other words, bumps 2018a and 2018b are formed inside casing 200, a casing assembled by upper casing 201 and lower casing 202, while torsion spring 205 wrapped around bumps 2018a and 2018b first and disposed inside casing 200 afterwards.

Figure 3A:
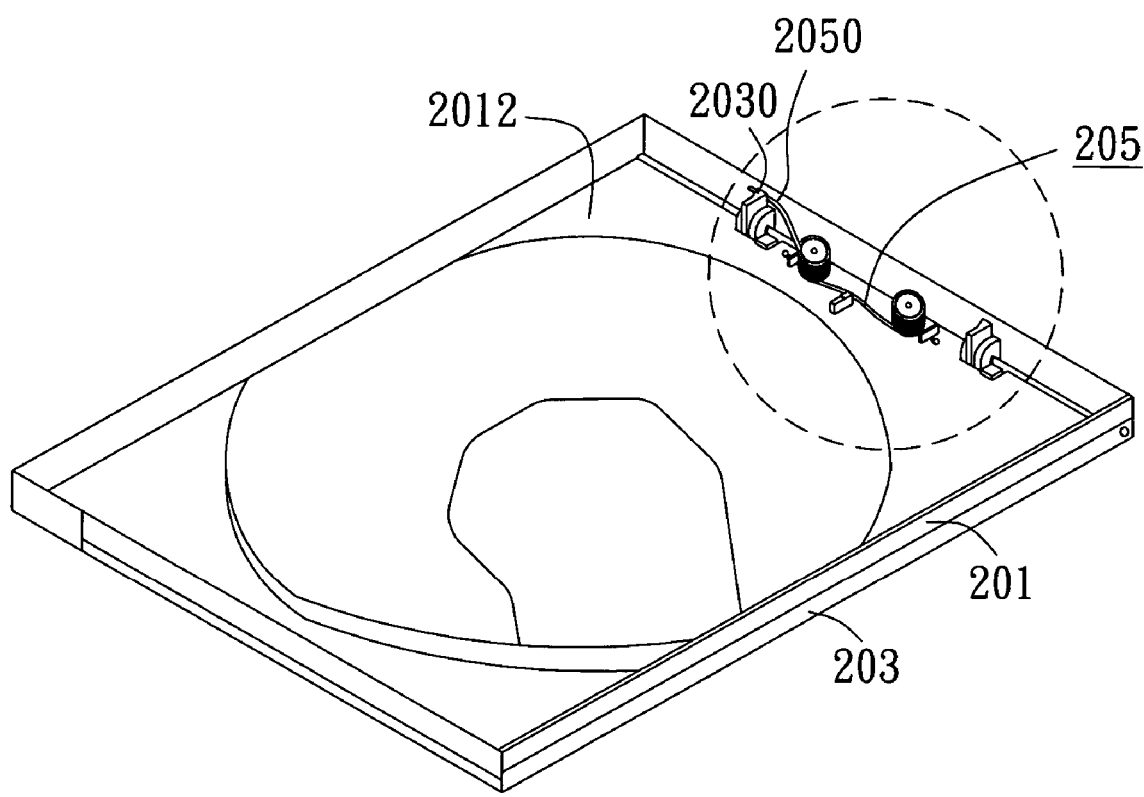
FIG. 3A shows a schematic diagram of a slim-type disc drive without a lower casing.
Figure 3B:
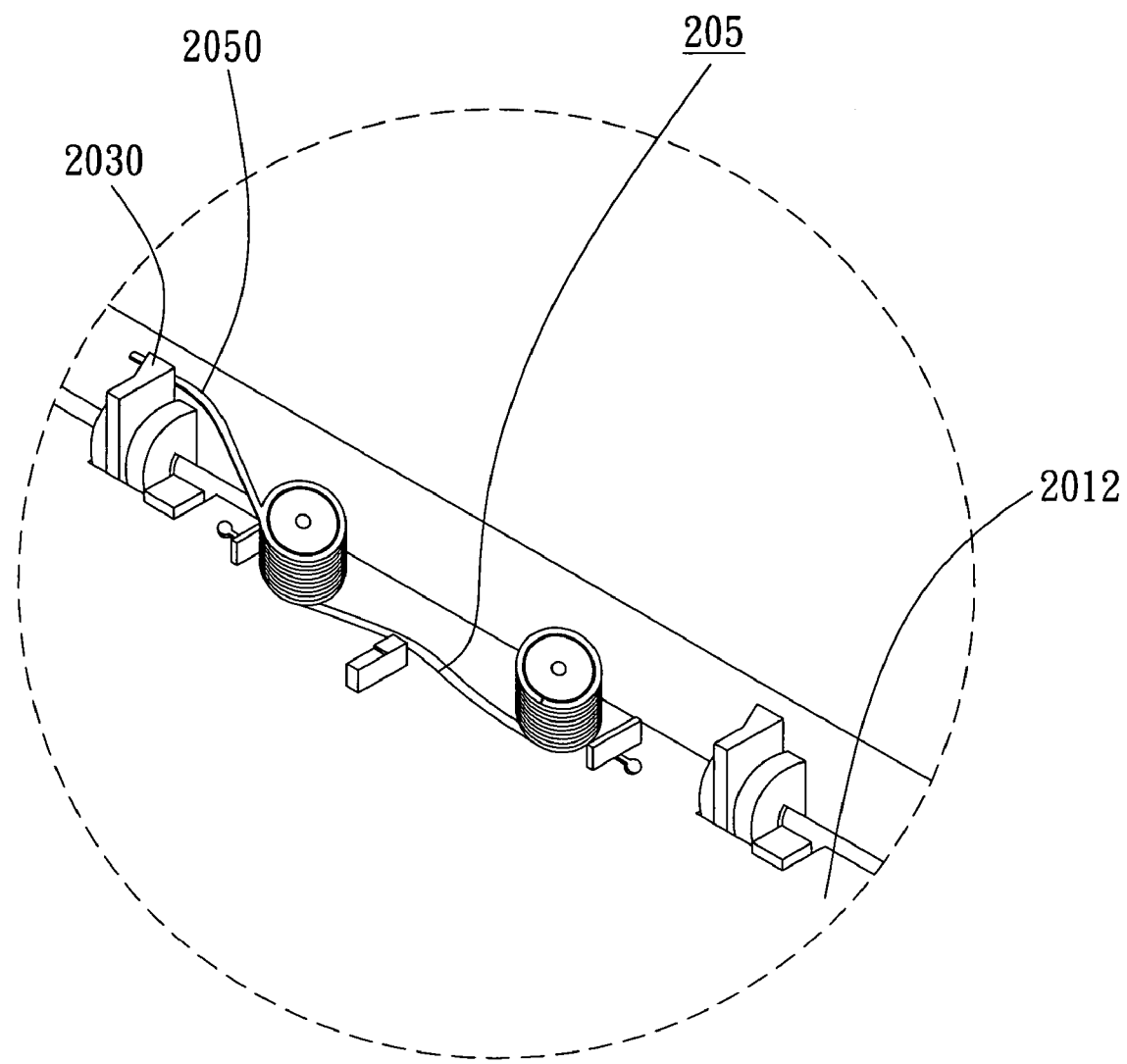
FIG. 3B is a partial enlargement of FIG. 3A.

Referring to FIG. 3A and FIG. 3B. FIG. 3A is a three-dimensional diagram of FIG. 2B while FIG. 3B is a partial enlargement of FIG. 3A. It can be seen from the diagrams that the torsion spring disposed on the second side 2012 of upper casing contacts the projection section 2030 on the hinge cover 203 in FIG. 2A. Furthermore, when hinge cover 203 covers up the indentation section situated at the first side of upper casing 201, torsion spring applies elasticity (spring) force onto the projection section 2030 which passes through the hole on hinge cover 203. That is to say, projection section 2030 receives the elasticity force from the distorted torsion spring.

Figure 4A:
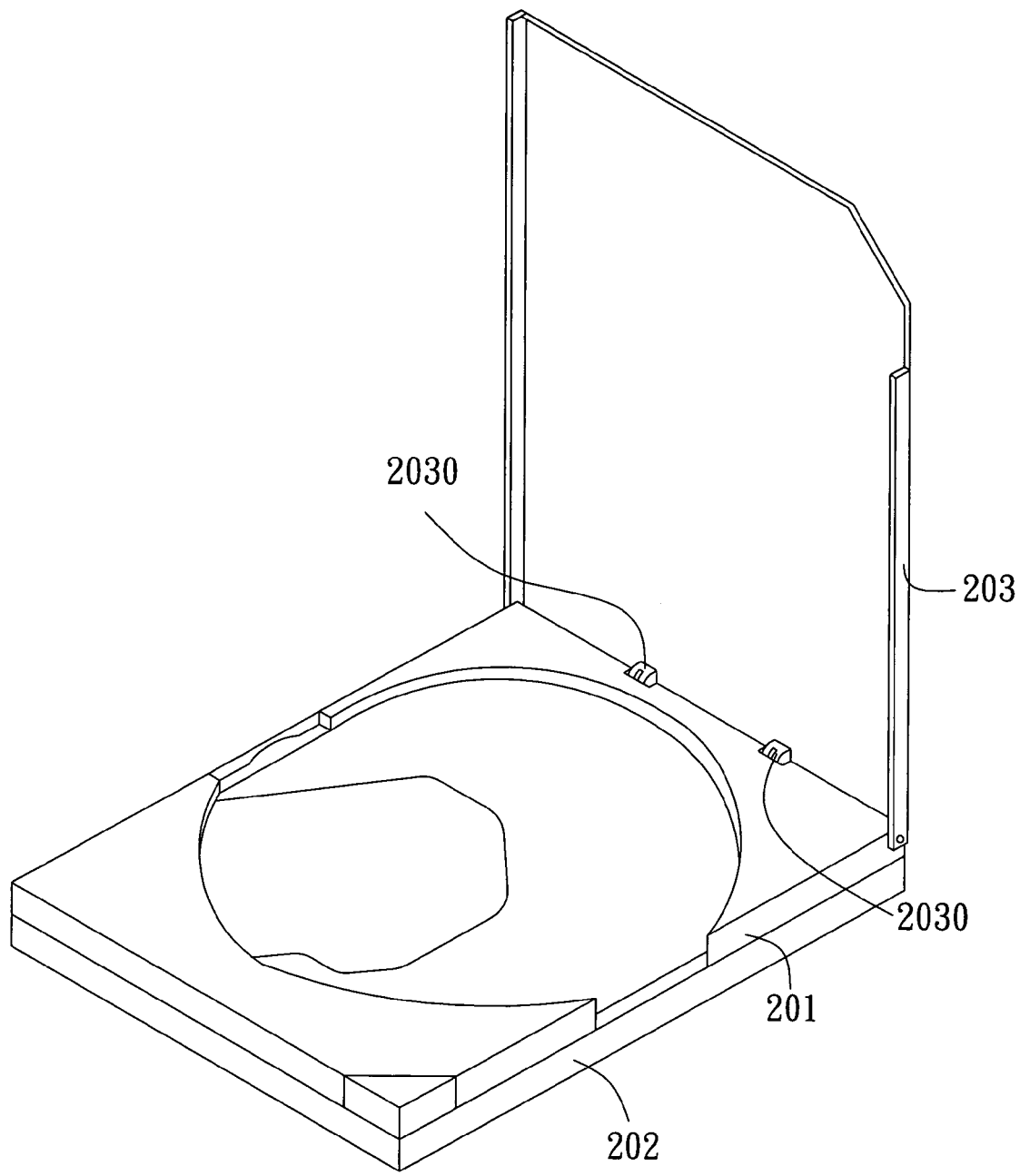
FIG. 4A is a schematic diagram showing the status when the hinge cover is opened from the upper casing.
Figure 4B:
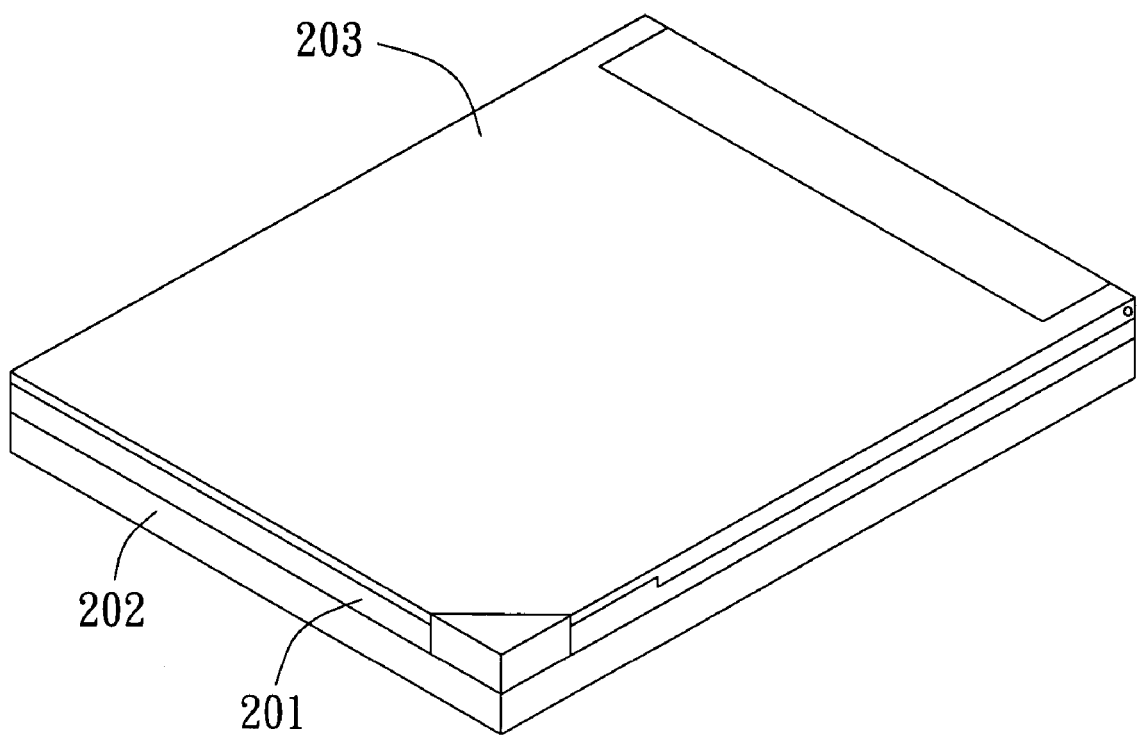
FIG. 4B is a schematic diagram showing the status when the hinge cover is closed to the upper casing.
Figure 4C:
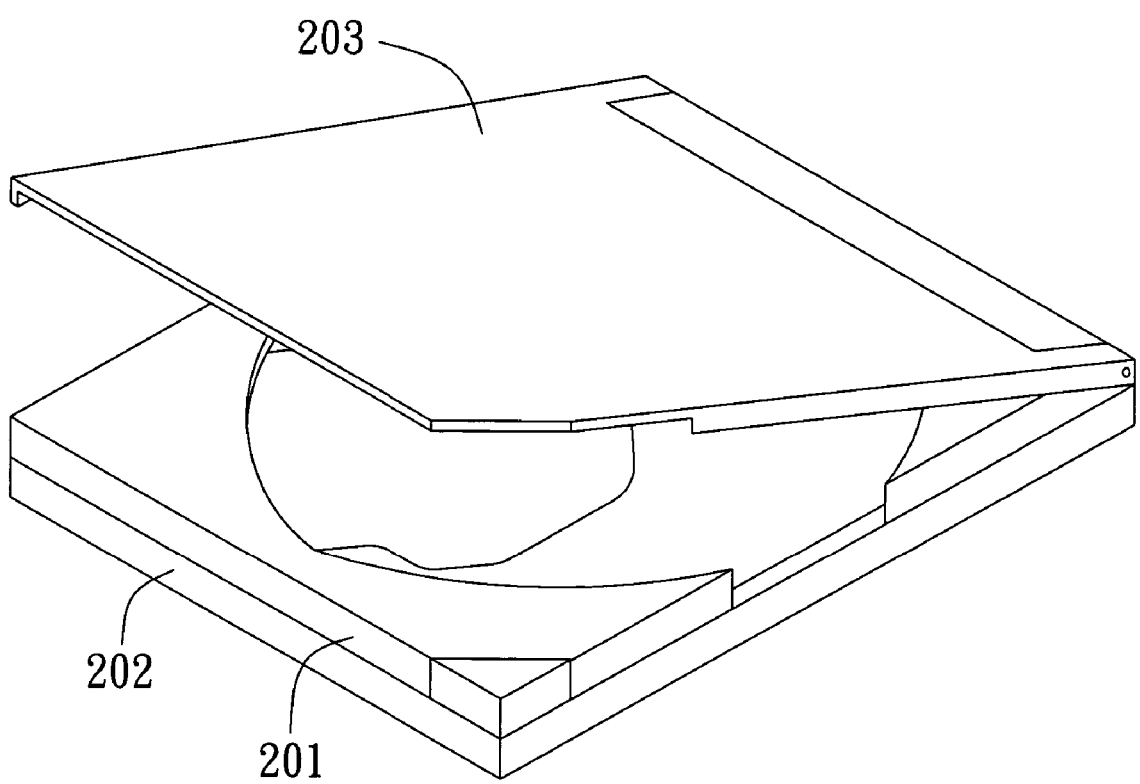
FIG. 4C is a schematic diagram showing the status when the torsion spring s uplifting the hinge cover.

After being pivotally coupled to upper casing 201, the hinge cover 203 shown in FIG. 2A has an open status as shown in FIG. 4A and a close status as shown in FIG. 4B in relation to upper casing 201. As shown in FIG. 4A and FIG. 4B, when hinge cover 203 is closed in relation to upper casing 201, projection section 2030 makes the torsion spring elastically distorted hence energy can be stored therein, wherein elastically distorted torsion spring 205, via tail end 2050 thereof, applies elasticity force onto projection section 2030. As shown in FIG. 4C, when hinge cover is opened, the elastically distorted torsion spring will release the stored energy to uplift hinge cover 203.

It can be understood from the above disclosure that without affecting any function of slim-type disc drive 20 according to the invention, the elasticity element can be torsion spring 205 or any other element which can be contacted by projection section 2030 and caused elastic distortion thereto accordingly. The elasticity element, which stores energy when distorted by projection section 2030, applies elasticity force onto projection section 2030 so as to uplift hinge cover 203 when elasticity recovers. Furthermore, the elasticity element is concealed and disposed inside the casing assembled by upper casing 201 and lower casing 202. That is to say, the user cannot see torsion spring 205 from outside the casing 200.

In short, the slim-type disc drive disclosed in the above embodiment according to the invention has at least the advantage of having a concealed elasticity element, a torsion spring for instance, disposed inside the casing of the slim-type disc drive preventing other objects from getting hooked on the torsion spring. Given the above feature, the slim-type disc drive according to the invention has an even more attractive appearance in an integral shaping.

While the features of the invention are disclosed in the above embodiment, the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slim-type disc drive, comprising:
   a casing having an indentation section that accommodates a CD, and a hole that communicates an inside of the casing with an outside of the;
   a hinge cover which is pivotally connected to the casing, and is movable to a closed position in which the hinge cover covers up the indentation section, and is movable to an open position in which the indention section is uncovered, the hinge cover having a projection that passes through the hole, the projection having a free end that is disposed inside of the casing at all times irrespective of whether the hinge cover is in the closed position or the open position; and
   an elasticity element which is disposed entirely inside the casing at all times irrespective of whether the hinge cover is in the closed position or the open position, the elasticity element contacting the free end of the projection, the free end receiving an elasticity force from the elasticity element when the hinge cover covers up the indentation section;
   wherein the elasticity element is a torsion spring comprising a tail end through which the torsion spring applies the elasticity force onto the free end of the projection.

2. A slim-type disc drive according to claim 1, wherein the casing comprises an upper casing, which is pivotally coupled to the hinge cover, the upper casing having the indentation section and the hole formed thereon.

3. A slim-type disc drive according to claim 2, wherein the upper casing has a first side and a second side, wherein the first side can be covered up by the hinge cover while the second side, which is the rear side of the first side, has the elasticity element disposed thereon.

4. A slim-type disc drive according to claim 3, wherein the casing further comprises a lower casing which is coupled to the upper casing to cover up the second side.

5. A slim-type disc drive according to claim 1, wherein a bump is formed inside the casing and that the elasticity element further comprises a wraparound section through which the torsion spring is wrapped around the bump.

6. A slim-type disc drive according to claim 5, wherein the casing comprises an upper casing, which is pivotally coupled to the hinge cover, the upper casing having the indentation section and the hole formed thereon.

7. A slim-type disc drive according to claim 6, wherein the upper casing has a first side and a second side, wherein the first side can be covered up by the hinge cover while the second side, which is the rear side of the first side, has the bump formed thereon.

* * * * *